Aug. 15, 1967  H. L. PASTAN  3,336,555
UNFILLED PRESSURE TRANSDUCER WITH STRAIN GAGE SENSING MEANS
Filed Jan. 15, 1965  2 Sheets-Sheet 1
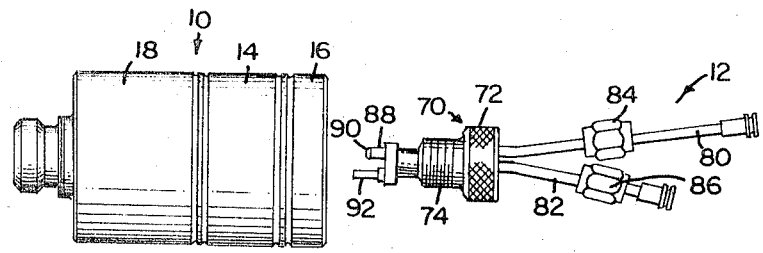
FIG.1
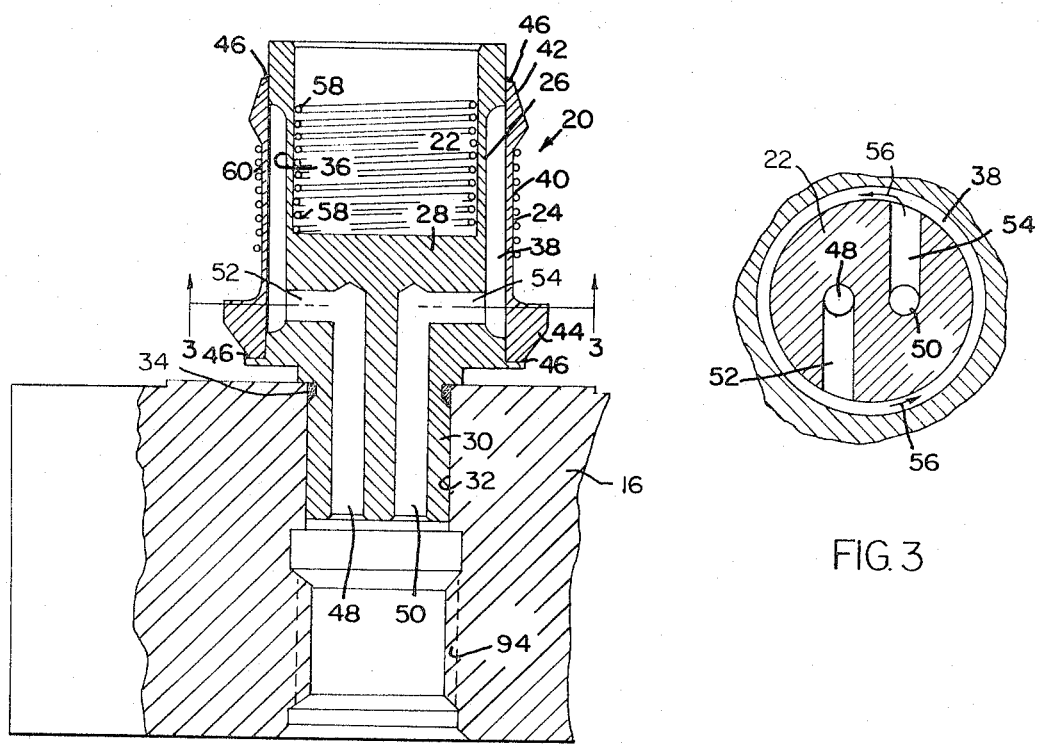
FIG.2
FIG.3
INVENTOR
HARVEY L. PASTAN
BY,
Wolf, Greenfield + Hieken
ATTORNEYS Aug. 15, 1967   H. L. PASTAN   3,336,555
UNFILLED PRESSURE TRANSDUCER WITH STRAIN GAGE SENSING MEANS
Filed Jan. 15, 1965   2 Sheets-Sheet 2

INVENTOR
HARVEY L. PASTAN
BY,
Wolf, Greenfield & Hieken
ATTORNEYS

United States Patent Office 3,336,555
Patented Aug. 15, 1967

3,336,555
UNFILLED PRESSURE TRANSDUCER WITH STRAIN GAGE SENSING MEANS
Harvey L. Pastan, Brookline, Mass., assignor to Dynisco, Division of American Brake Shoe Company, Cambridge, Mass., a corporation of Delaware
Filed Jan. 15, 1965, Ser. No. 425,750
9 Claims. (Cl. 338—4)

This invention relates to fluid pressure sensing transducers and more particularly comprises a new and improved unfilled direct sensing pressure transducer.

At the present time there are two general types of direct sensing pressure transducers which employ a capsule having one or more annular chambers with deformable inner and outer walls that distort in direct response to changes in pressure of fluid being measured. In one type of instrument the annular chamber or chambers is filled with a liquid such as oil, and the oil is retained in the chamber by a soft diaphragm which covers a passage also filled with the liquid and in communication with the chamber. The soft diaphragm is adapted to be exposed directly to the fluid whose pressure is to be measured, and any pressure exerted upon the diaphragm is transmitted through the diaphragm to the liquid confined to the passage and chamber. A strain gage secured to the cylindrical walls of the chamber senses the distortion of the walls in response to the pressure changes.

In certain settings the type of transducer described in the preceding paragraph is not useable. For example, it cannot be used to measure fluid pressure at exceedingly low temperatures, because the oil in the filled capsule would freeze. Consequently, for low temperature applications, the annular chamber in the direct sensing devices is allowed to fill directly with the fluid whose pressure is being measured, and the walls of the capsule respond directly to the pressure of that fluid. In such devices it is essential that the capsule chamber and the passages leading to and from it be capable of being cleaned to a very high standard, because when such devices are used, typically in the measurement of the pressure in combustion chambers of rocket engines, the fuels used in such devices are very unstable and may explode when they come in contact with any extraneous matter that may have collected in and contaminated the transducer.

One important object of this invention is to provide a fluid pressure sensing transducer which is capable of being very thoroughly cleaned.

Another important object of this invention is to provide an unfilled direct sensing pressure transducer which establishes a definite circulation pattern for cleaning liquid passed through it.

Another important object of this invention is to provide a direct sensing pressure transducer and a special flushing tool which are compatible with one another to facilitate the circulation of cleaning liquid through the transducer.

These and other objects and features of this invention along with its incident advantages will be better understood and appreciated from the following detailed description of several embodiments thereof, selected for purposes of illustration and shown in the accompanying drawing, in which:

FIG. 1 is an exploded view of a pressure transducer and cleaning tool constructed in accordance with this invention;

FIG. 2 is a fragmentary detail view of a portion of the pressure transducer shown in FIG. 1;

FIG. 3 is a cross-sectional view taken along the section line 3—3 of FIG. 2;

Figure 4:
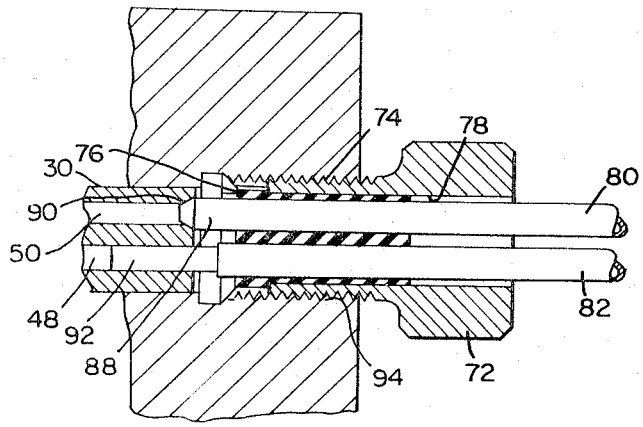
FIG. 4 is a fragmentary cross-sectional view illustrating the manner in which the flushing tool is connected to the transducer.

The embodiment of the invention shown in FIG. 1 includes a transducer 10, and flushing tool 12. The transducer 10 includes a body 14, a capsule base 16 secured to one end of the body and a cap 18.

In FIGS. 2 and 3 some of the details of one embodiment of the transducer are shown. In that embodiment the transducer is shown to include a pressure capsule 20 composed of an inner cylindrical member 22 and an outer cylindrical member 24. The cylindrical member 22 includes a deformable wall 26, and the wall 26 is closed at one end by a base plate 28. The base plate 28 is integrally formed with a stem 30 which is shown in FIG. 2 to be disposed within an opening 32 in the capsule base 16. The stem 30 is held in place in the opening 32 by the brazed joint 34.

The inner cylindrical wall 26 of the member 22 is provided with an annular recess 36 which cooperates with the outer cylindrical member 24 to define an annular chamber or cavity 38. In FIG. 2 it will be noted that the outer cylindrical wall 24 has a deformable central portion 40 and enlarged end portions 42 and 44, which end portions are brazed or otherwise secured to the outer surface of the inner member 22 as suggested at 46.

The chamber 38 defined by the walls 24 and 26 is designed to receive and be filled with the fluid whose particular pressure is being measured. Thus, the pressure of that fluid is exerted directly against the flexible or deformable portion 40 of the outer wall 24 and the deformable portion 26 of the inner member 22. The fluid is introduced into the chamber through a pair of pressure ports 48 and 50 which extend upwardly through the stem 30 from its lower end to the base plate 28. A pair of passages 52 and 54 extend outwardly from the inner ends of the ports 48 and 50. The passages 52 and 54 are not radially oriented with respect to the chamber 38 for reasons made clear below.

Figure 6:
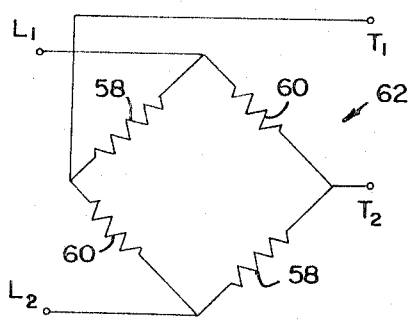
FIG. 6 is a schematic diagram of the signal generating circuit forming a part of the transducer.

A pair of wire strain gages 58 are wound about and bonded to the inner surface of the portion of wall 26 which defines the chamber 38. A second pair of wire strain gages 60 are bonded to the outer surface of the deformable portion 40 of the outer cylindrical wall 24. As suggested in FIG. 6, each of the wire strain gages forms one leg of a bridge circuit 62 which may be energized from some remote location through lines $L_1$ and $L_2$. A meter (not shown) may be connected to the bridge at some remote location across terminals $T_1$ and $T_2$ to measure the voltage across the bridge.

As suggested in the introduction, a transducer of the type shown is used by connecting the capsule base 16 directly to a line carrying the fluid whose pressure is to be measured. The fluid whose pressure is to be measured enters the chamber 36 through the ports 48 and 50 and passages 52 and 54, and the fluid fills the chamber 38. The pressure of the fluid is then exerted directly against the walls 24 and 26, and those walls distort in response to that pressure. The strain gages 58 and 60 are positioned to measure the distortion of the walls and that measurement is a direct function of the pressure exerted.

In the introduction it was stated that it is essential that transducers of this type be capable of being thoroughly cleaned so as to remove all foreign matter from them. Any particles which remain in the chamber may be carried into the fuel line of a rocket engine when the transducer is used to render measurements in such devices, and certain rocket fuels may explode when they come in contact with such particles. The flushing tool 12 in combination with the orientation of the passages 52 and 54 make it possible to achieve very thorough cleaning of the device.

As described above, the passages 52 and 54 are oriented in a nonradial direction with respect to the chamber 38. As shown, the passages are oriented in a plane normal to the axis of the annular chamber 38. Consequently, when the fluid enters into the chamber 38 through either one of the passages 52 or 54, counterclockwise circulation is established in the chamber as is evident in FIG. 3. Consequently, when one of the ports 48 and 50 is connected to a source of cleaning liquid and the other of the ports is connected so as to discharge the cleaning liquid from the chamber 38, circulation is established in the chamber 38 to achieve maximum cleaning of the device.

The flushing tool 12 includes a clamp 70 having a knurled head 72 and an externally threaded collar 74. A sealing gasket 76 fills the cross section of the bore 78 in clamp 70 throughout a portion of its length, and a pair of tubes 80 and 82 extend through openings in the gasket and extend completely through the clamp. The tubes 80 and 82 diverge from one another rearwardly from the head 72 of the clamp to facilitate connecting them to a flushing solution line and a waste line. In the configuration of the tool shown, the tube 80 is adapted to be connected to a flushing solution line by means of the coupling 84, and the tube 82 is adapted to be connected to a waste line by means of the coupling 86.

The discharge end 88 of the tube 80 is bevelled as shown at 90 so as to fit within the beveled ends of either of the ports 48 and 50. The adjacent end 92 of the tube 82 has a reduced diameter to enable it to fit within the other of the ports. That is, when the end 88 of the tube 80 is connected to the port 50 in the stem 30, the reduced end 92 of the other tube 82 is inserted into the port 48. This arrangement is clearly evident in FIG. 4.

In FIG. 4 it is further evident that the threaded collar 74 of the clamp 70 may be screwed into the lower threaded section 94 of the opening 32 in the capsule base 16. The clamp 70 retains the tubes 80 and 82 in alignment with their respective ports in the stem 30. When the tool 12 is used to flush the transducer, the tubes 80 and 82 are inserted into the opening 32 and aligned with the pressure ports. Then the threaded collar 74 is screwed into the section 94 of the opening to form a firm connection between the clamp and the base 16. The tubes 80 and 82 are respectively connected to a flushing solution line and the waste line. Flushing should then be done at a pressure at a minimum of 25 p.s.i. After the flushing solution has been passed through the transducer for a specified period, the connections of the tubes 80 and 82 may be reversed with respect to the ports 48 and 50 so as to cause flow in the ports and the passages 52 and 54 in an opposite direction.

As suggested above, when the flushing solution enters the chamber 38 either through the passage 52 or 54, circulation is established in the chamber 38 as suggested by the arrow 56. This is caused by the nonradial orientation of the two passages. As shown, the passages 52 and 54 are perpendicular to the axis of the chamber 38 but are not oriented so as to radiate from that axis. Consequently, cleaning solution leaving either of the passages 52 or 54 and entering chamber 38 strikes the inner surface of member 24, which acts as a baffle to start the counterclockwise circulation suggested by arrow 56 in FIG. 3. The circulating flow of the liquid and the ability to reverse flow through the ports and passages allows the transducer to be very thoroughly cleaned.

It will be noted in the drawing that the stem 30 of the capsule is of relatively small diameter with respect to the diameter of the chamber 38. As explained in my co-pending application Ser. No. 425,751 filed on even date herewith, the small unthreaded stem substantially eliminates the transfer of bending stresses from the base 16 to the capsule which would otherwise produce extraneous transducer output.

Figure 5:
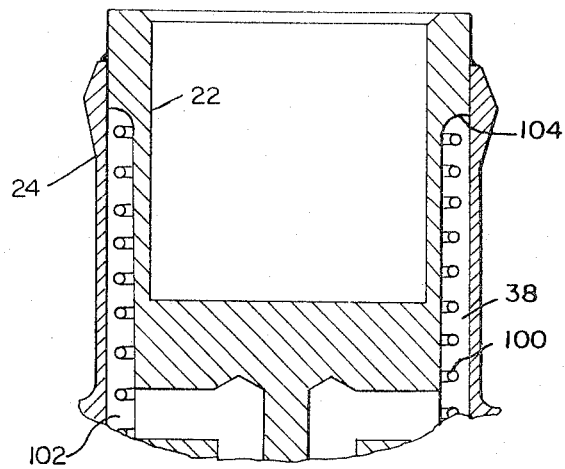
FIG. 5 is a fragmentary cross-sectional view similar to FIG. 2 illustrating a modification of the invention.

From the foregoing description those skilled in the art will appreciate that numerous modifications may be made of this invention without departing from its spirit. For example, the stem 30 of the capsule 20 may be integral with the outer cylindrical wall 24 of the capsule rather than the inner cylindrical wall 22 as shown. One modification of this invention is shown in FIG. 5. In the embodiment of FIG. 5 the inner and outer cylindrical members 22 and 24 take the same form as those in the embodiment of FIG. 2, and the passages for introducing liquid to the annular chamber 38 are also the same. However, in the chamber 38, a coil of wire 100 is shown in the form of a helix extending from the bottom 102 of the chamber 38 to its top 104. The coil of wire 100 in the chamber 38 will guide the solution entering the chamber 38 upwardly in the chamber to assure intimate contact of the flushing solution with the whole inner surfaces of the inner and outer members 22 and 24 that define the chamber 38. This coil 100 may also be used to aid in the establishment of circulation in the direction of arrow 56 as suggested in FIG. 3.

Because numerous modifications may be made of this invention without departing from its spirit, it is not intended to limit the breadth of this invention to the two embodiments illustrated and described. Rather, it is intended that the scope of this invention be determined by the appended claims and their equivalents.

What is claimed is:

1. In a pressure transducer, a direct pressure sensing capsule comprising inner and outer generally flexible cylindrical walls defining an annular cavity between them.

strain gauge means connected with said cylindrical walls and sensitive to changes in the shape of said walls, a cylindrical stem secured to one of the two walls and having a diameter substantially smaller than the inner diameter of the cavity, a pair of axially extending pressure ports through the stem, a pair of passages connected to the inner ends of the ports and connecting the ports to the cavity adjacent one end thereof, said passages opening into the cavity in a nonradial direction with respect to the axis of the cavity, means disposed in the cavity guiding a liquid introduced through one of the ports to move in the cavity toward the other end, a capsule base having an opening therein into which the stem extends, and a threaded section provided in the base beyond the stem for receiving a clamp of a flushing tool.

2. In a pressure transducer, a direct pressure sensing capsule comprising, an inner and an outer cylindrical wall defining an annular resiliently expandable chamber between them, strain gauge means secured to the inner and outer cylindrical walls and sensitive to changes in the shape of said walls resulting from changes in pressure within said chamber, a base plate secured to one of the cylindrical walls, a stem integral with the base plate and extending axially away from the cylindrical walls, a port provided through the stem and terminating in the plate, a nonradial passage in the plate leading from the end of the port to the chamber, said port and passage cooperating to allow a cleaning liquid to be directed into the chamber and circulating in the chamber, and means connected to the chamber and separate from the port and passage for discharging cleaning liquid from the chamber.

3. In a pressure transducer, a direct pressure sensing capsule comprising inner and outer generally cylindrical walls defining a resiliently expandable cavity between them, strain gauge means connected with said cylindrical walls and sensitive to changes in the shape of said walls, a cylindrical stem secured to one of the two walls and having a diameter substantially smaller than the inner diameter of the cavity, a pair of axially extending pressure ports through the stem, a pair of passages connected to the inner ends of and extending perpendicular to the ports and connecting the ports to the cavity adjacent one end thereof, said passages opening into the cavity in a nonradial direction with respect to the cavity, a capsule base having an opening therein into which the stem extends, and a threaded section provided in the base beyond the stem for receiving a clamp of a flushing tool.

4. In a pressure transducer, a pressure capsule having an annular resiliently expandable cavity defined by a pair of cylindrical walls, strain gauge means connected with at least one of said cylindrical walls and sensitive to changes in the shape of at least one of said walls, a stem extending axially from one end of the capsule, and means including a pair of passages for directing liquid into the annular cavity nonradially with respect to the cavity axis.

5. A pressure transducer as defined in claim 4 and further characterized by port means extending through the stem and connected to the passages.

6. A pressure transducer as defined in claim 5 and further characterized by a base secured to the stem and having an opening therein communicating with the port means for securing the clamp of a flushing tool.

7. A pressure transducer as defined in claim 6 and further characterized by said port means including a pair of ports each connected to one of the passages.

8. In a pressure transducer, a pressure capsule having an annular resiliently expandable cavity defined by a pair of cylindrical walls, strain gage means connected to at least one of said cylindrical walls and sensitive to changes in the shape of at least one of said walls, a stem extending from the capsule, and means including a pair of passages extending through the stem for directing liquid into, about, and out of the annular cavity.

9. In a pressure transducer as defined in claim 8, further characterized by a capsule base having an opening therein into which the stem extends, and means provided in the base beyond the stem for securing a flushing tool thereto to direct liquid into and out of the passages.

References Cited

UNITED STATES PATENTS

| | | | |
|---|---|---|---|
| 1,205,508 | 11/1916 | Bodell | 285—131 X |
| 1,225,777 | 5/1917 | Graig | 285—27 |
| 2,298,007 | 10/1942 | Goepfrich | 92—50 X |
| 2,398,372 | 4/1946 | Green | 73—398 |
| 2,470,714 | 5/1949 | Nevius | 73—398 |
| 2,744,484 | 5/1956 | Stockard | 285—27 X |
| 2,856,452 | 10/1958 | Appleton et al. | 285—137 X |
| 2,883,503 | 4/1959 | Osgood | 73—398 |
| 2,933,707 | 4/1960 | Blystone et al. | 73—398 |

FOREIGN PATENTS

| | | |
|---|---|---|
| 200,513 | 11/1958 | Austria. |
| 957,909 | 5/1964 | Great Britain. |

MARTIN P. SCHWADRON, *Primary Examiner.*

I. C. COHEN, *Assistant Examiner.*